United States Patent [19]
Kubota et al.

[11] Patent Number: 4,866,535
[45] Date of Patent: Sep. 12, 1989

[54] METHOD AND DEVICE FOR INTERFACING AN IMAGE SCANNER WITH AN IMAGE PROCESSING DEVICE

[75] Inventors: Mineo Kubota, Yamanashi; Tuyos Isomura, Ena, both of Japan

[73] Assignee: Kabushiki Kaisha, Kofu, Japan

[21] Appl. No.: 223,008

[22] Filed: Jul. 22, 1988

[30] Foreign Application Priority Data

May 19, 1988 [JP] Japan ................................ 63-122287

[51] Int. Cl.⁴ .......................... H04N 1/04; H04N 1/10
[52] U.S. Cl. ...................................... 358/474; 382/59; 358/494
[58] Field of Search ............... 358/285, 293, 280, 282; 382/59

[56] References Cited

U.S. PATENT DOCUMENTS

| | | | |
|---|---|---|---|
| 4,196,450 | 4/1980 | Miller et al. | 358/280 |
| 4,587,633 | 5/1986 | Wang et al. | 340/720 |
| 4,652,937 | 3/1987 | Shimura et al. | 358/293 |
| 4,707,747 | 11/1987 | Rockwell, III | 358/285 |
| 4,731,668 | 3/1988 | Satomura et al. | 358/256 |
| 4,797,544 | 1/1989 | Montgomery et al. | 382/59 |

Primary Examiner—James J. Groody
Assistant Examiner—Kim Yen Vu
Attorney, Agent, or Firm—Oblon, Spivak, McClelland, Maier & Neustadt

[57] ABSTRACT

Video data signals which are generated from a portable image scanner and temporarily stored in a shift register in an interface circuit are transferred to an external image processing device such as a word processor through a switching circuit which turns on upon reception of a transfer permission signal from a latching circuit for validating scanning condition. Since the transferring of the video data signals to the image processing device are effected without being controlled by the image processing device, it can be performed at high speed without causing a scanning error even if the sub-scanning speed is rather increased.

3 Claims, 6 Drawing Sheets

FIG_5

METHOD AND DEVICE FOR INTERFACING AN IMAGE SCANNER WITH AN IMAGE PROCESSING DEVICE

BACKGROUND OF THE INVENTION

1. Field of the Invention:

This invention relates to a method and a device for interfacing an image scanner with an image processing device. More particularly, this invention relates to a method for speedily transferring video signals, which are obtained as a result of scanning a given objective image with a portable image scanner, to an image processing device such as a computer and a word processor, and to an interface circuit used for practicing this method.

2. Description of the Prior Art

In image processing systems, an interface is required for linking an image reading device such as an image scanner and an image processing device such as a computer and a word processor. A desktop image scanner capable of automatically scanning a given objective image at a constant speed can easily effect synchronous transfer of video data signals obtained as a result of scanning to the image processing device. On the other hand, a portable image scanner, which is manually moved in a sub-scanning direction in order to read the objective image, is very difficult to control the timing of the video data transfer to the image processing device. The interface for use in such a manual image scanner necessitates not only a function of transferring electrical signals from the image scanner to the image processing device, but also a function of temporarily storing the video signals in a memory and outputting the stored video signals by prescribed bits thereof each time the image scanner is manually moved for one sub-scanning line on the objective image.

The timing of video data transfer from the image scanner to the interface has heretofore been controlled by use of synchronous clock pulses generated by an external host computer for image processing in a conventional image processing system.

Japanese Patent Application Public Disclosure No. SHO 63-33058(A) discloses an interface circuit by which video data having some bits of high order which indicate the sub-scanning line being read are temporarily stored and transferred to a host computer while being timed under the control of the host computer, as illustrated schematically in FIG. 1. This image reading device in the prior art system adopts a portable image scanner I/S composed of an image sensor 1 such as a CCD device for optically reading out a given objective image I, a digitizer 2 for digitizing analog image signals outputted from the image sensor 1 to the corresponding binary-coded video signals Vs, a sub-scanning encoder 3 which generates sub-scanning clock pulses Ep in accordance with rotation of a roller for allowing the image scanner I/S to move in a sub-scanning direction, and a timing pulse generator 4 for generating address-up signals Ta and addressing signals Tb by dividing standard timing clock pulses. The interface circuit I/F in the prior art system is composed of a shift register 5 for storing the video signals Vs outputted in sequence from the image scanner I/S, a counter 6 for counting the address-up signals Ta and the addressing signals Tb, a switching circuit (Sw.) 7 consisting of flip-flop circuits and adapted to permit the video signals Vs stored in the shift register 5 to be transferred to the external image processing device (host computer) H/C upon reception of a transfer permission signal given by the aforesaid counter 6, and a memory 8 for storing all the video signals Vs which are fed from the shift register 5 via the switching circuit 7 while being addressed by the counter 6. The memory 8 is allowed to transfer the video signals stored therein to the external host computer H/C upon reception of a transfer command So from the host computer H/C. To be more specific, the video signals fed in serial from the image scanner I/S are temporarily stored in the shift register 5, and thereafter, transferred by one unit of n-bits (e.g. n=8) in parallel to the memory 8 by the permission of the switching circuit 7. Though the video signals Vs are stored in the memory 8 while being addressed by an addressing counter 6a in the counter 6, the transferring of the video signals Vs by one transfer unit of n-bits to the memory 8 is managed by an address-up counter 6b in the counter 6. Upon completion of reading all picture elements (e.g. 1024 pixels) for one sub-scanning line, a sub-scanning pulse Ep, which is generated by the sub-scanning encoder 3 each time the sub-scanning line is updated, is given to the host computer H/C through the interface I/F, and a sub-scanning condition is validated by the host computer before the transfer command So with addressing data is sent from the host computer H/C to both the counter 6 and memory 8. When the transfer command So is given to input-stage gates of the counters 6a, 6b, these counters are reset to assume their inactive state. In this state, the video signals for one sub-scanning line are transferred to the host computer H/C.

The aforementioned interface circuit in the prior art image processing system calls for large capacity memories capable of storing a mass of video data representing the informations of all the picture elements (e.g. 1024 pixels) in one sub-scanning line together with addressing data specifying the address of every pixel in the memory. This entails a disadvantage that adoption of the large capacity memory adds to the size and complexity of the interface and renders the image processing system scanning condition by the external host computer upon reception of the encoder pulse generated every updating of sub-scanning operation in the image scanner, before the video data stored in the shift register are transferred to the host computer through the switching circuit. However, the video signals outputted in sequence from the image scanner are inhibited from being written in the shift register when one sub-scanning is completed to reset the counter. Thus, in the course of transferring the video data stored in the shift register to the external host computer, image reading operation is interrupted. In other words, in order to continue the image reading operation which is effected by manually moving the portable image scanner in the sub-scanning direction, the image scanner should be moved as slow as possible. Fast movement of the image scanner will cause a sub-scanning error.

From the foregoing, it can be seen that the prior art system including the aforementioned conventional interface circuit has been subject to the control of an external control system such as the host computer and could not conduct concurrently the image reading-out processing and the data transferring processing. Thus, the conventional interfaces prevent the realization of a high-speed image processing system excellent in performance.

OBJECT AND SUMMARY OF THE INVENTION

This invention was made to overcome the problems of prior art described above and aims to provide a method for speedily transferring video data signals outputted from an image scanner to an external image processing device at low error rate, and an interface circuit used for practicing this method, which can transfer the video data signals effectively and reliably and is simple in circuit structure.

To accomplish the object described above according to the invention, there is provided a method for interfacing an image scanner which is manually handled to scan a given objective image and outputs video data signals as a result of scanning with an external image processing device, which comprises storing in a shift register the video data signals fed from the image scanner, validating scanning condition by verifying whether a sub-scanning is updated, and transferring the video data signals stored in the shift register by one transfer unit of bits to the image processing device when the scanning condition is judged to be valid.

An interface circuit for practicing the above method comprises a shift register for temporarily storing video data signals outputted from an image scanner, a counter which counts timining clocks generated by the image scanner and outputs a shift pulse each time transfer unit of bits are counted, a latching circuit for validating scanning condition by verifying whether a sub-scanning is updated and outputting a transfer permission signal when the scanning condition is valid, and a switching circuit for permitting the video data signals stored in the shift register to be transferred by the transfer unit of bits to an external image processing device upon reception of the shift pulse from the counter and the transfer permission signal from the latching circuit.

The validating of the scanning condition in the latching circuit is carried out in such a manner that the scanning condition is regarded as being valid when a sub-scanning line is not updated in the current sub-scanning on the condition that the sub-scanning line is updated in the preceding sub-scanning. Thus, the video data signals which are read out from the image scanner and temporarily stored in the shift register are transferred directly to the external image processing device as a host computer without need to receive instructions from the image processing device. As a result, the time required for transferring the video data signals from the image scanner to the image processing device can be remarkably reduced.

The features of the present invention which are believed to be novel are set forth with particularity in the appended claims. The present invention, both as to its organization and manner or operation, together with further objects and advantages thereof, may best be understood by reference to the following description, taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

The interface circuit employed for effecting the method according to this invention is interposed between a portable image scanner for scanning a given objective image to output video signals corresponding to the objective image, and an image processing device such as a word processor and adapted to validate the scanning condition on which the objective image is manually scanned with the image scanner.

Figure 1:
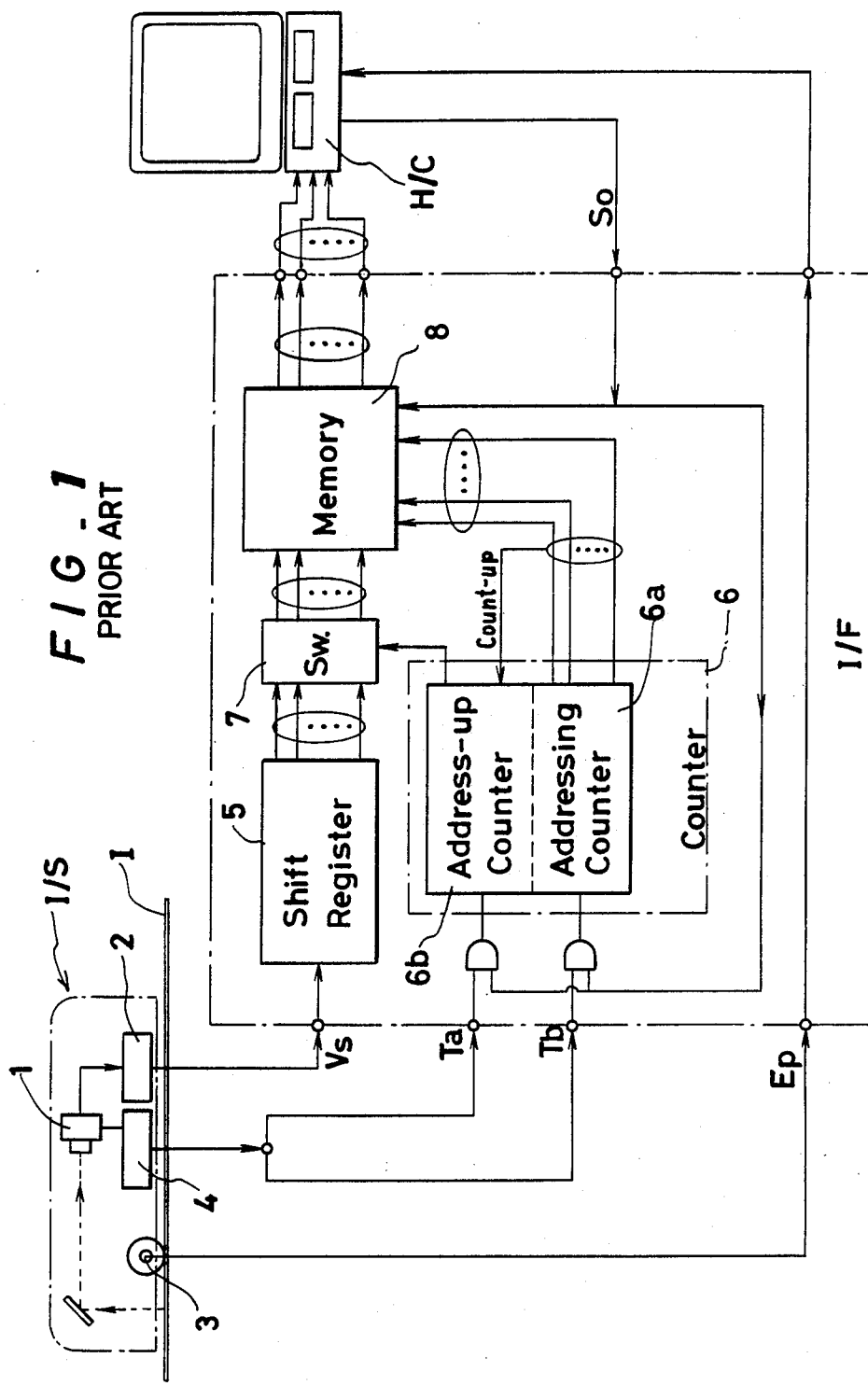
FIG. 1 is a block diagram schematically showing a prior art interface circuit used in an image processing system.
Figure 2:
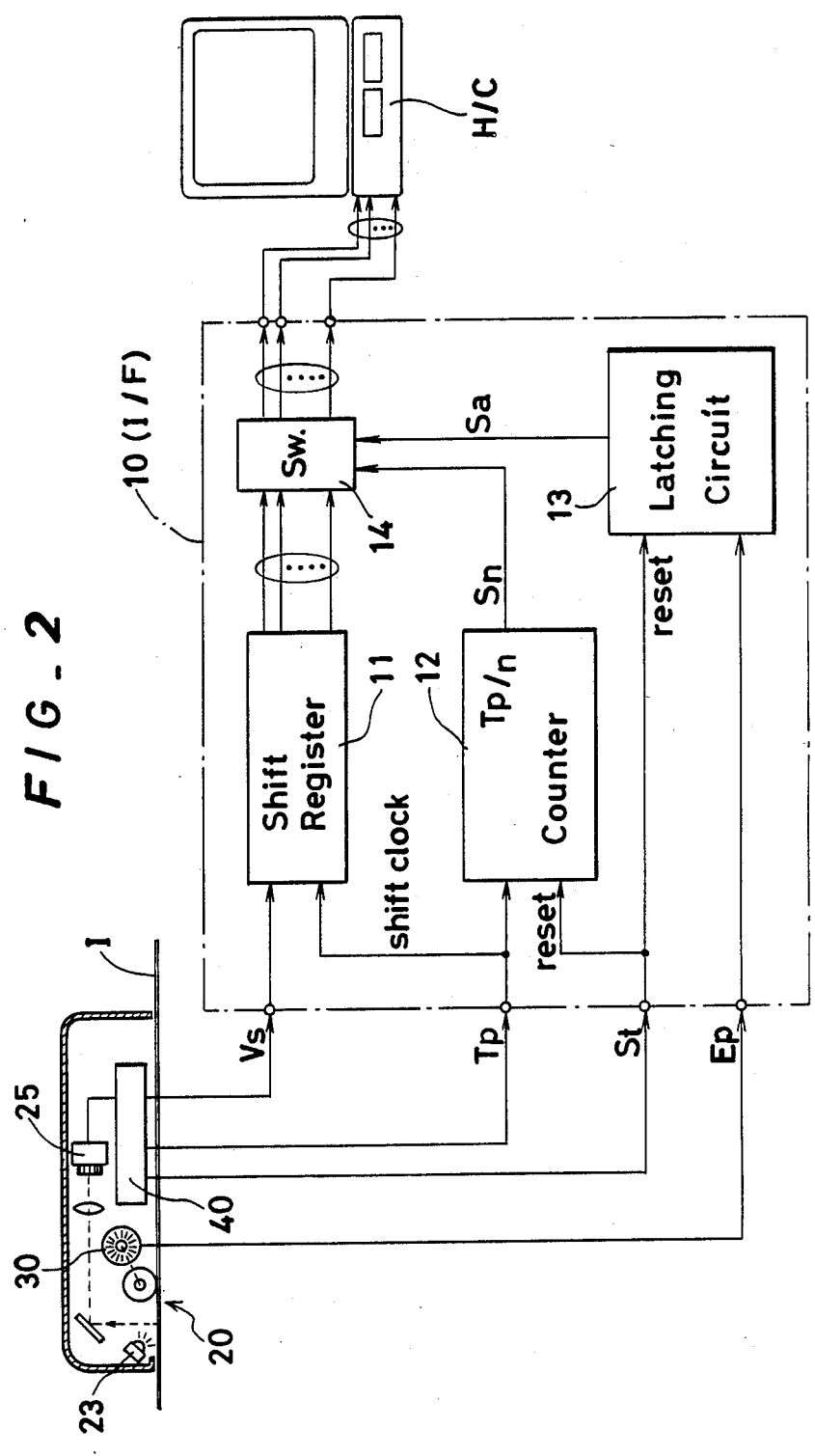
FIG. 2 is a block diagram schematically showing an interface circuit according to this invention.

Referring to the embodiment of the invention shown in FIG. 2, the interface circuit (I/F) 10 has an input stage connected to the image scanner 20 and an output stage connected to the image processing device (host computer) H/C such as a computer and a word processor.

Figure 3:
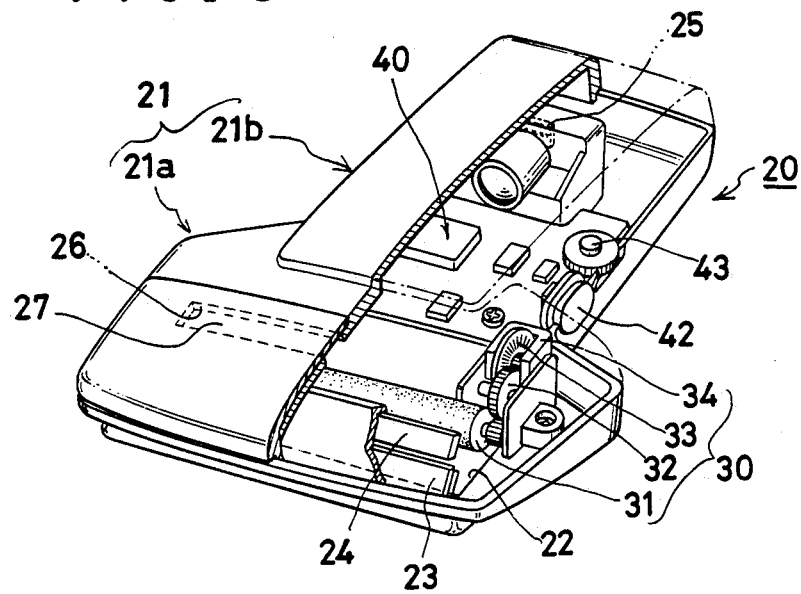
FIG. 3 is a partially sectioned perspective view of a portable image scanner to be used in this invention for reading an objective image.
Figure 4:
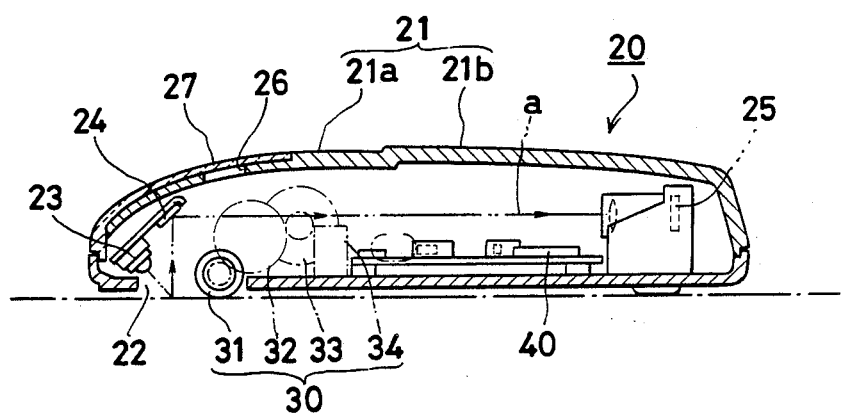
FIG. 4 is a sectional side view of the same.

The image scanner 20 is constituted by optical scanning means having an illuminator for illuminating the objective image and a photoelectric element, and sub-scanning encoder means. The image scanner 20 to be used in this invention is illustrated in FIGS. 3 and 4 by way of example. A casing 21 for accommodating the above means is defined by a reader portion 21a on the front part thereof and a grip portion 21b on the rear part thereof. In the bottom of the reader portion 21a, there is formed a reading opening 22 which gives a view of the objective image I.

The optical scanning means noted above comprises a light source 23 for illuminating the objective image plane I through the reading opening 22, a reflecting means 24 for refracting rearward a desired image light a reflected from the objective image plane I in the direction substantially parallel to the objective image plane I, and an image sensor 25 for converting the image light a from the objective image plane I to electric image data signals (video signals). In this embodiment, there is adopted a line scanning method in which the objective image to be scanned for reading out is notionally divided into a plurality of sub-scanning lines and scanned every sub-scanning line in order. Therefore, the light source 23 may be of the type capable of illuminating a linear portion on the objective image plane, and the image sensor 25 may be of the type capable of picking up as an image the linear portion illuminated with the light source 23. For instance, an array of light emitting diodes (LED) can be used as the light source 23, and a CCD line sensor can be used as the image sensor 25.

In the upper surface portion of the casing 21, there is formed a peep slot 26 through which the objective image I being open to the view in the reading opening 22 formed in the bottom of the casing 21 can be sighted from the above. The peep slot 26 is covered with a filter or decorative cover plate 27.

A sub-scanning encoder 30 contained in the casing 21 comprises a roller 31 for allowing the image scanner 20 to be manually moved in the sub-scanning direction, at least one gear 32 for transmitting the rotation of the roller 31, a synchronizing rotary disc 33 which rotates synchronously with the roller 31, and a rotation detector 34 for detecting the rotation of a predetermined amount of the rotary disc 33. The rotary disc 33 has many slots arranged radially. As the rotation detector 34, a photo-coupler or photo-interrupter may be used so that switching action can be optically effected by the existence of the slots formed in the rotary disc 33, thereby to output sub-scanning encoder pulses by the angular rotation of the predetermined amount of the rotary disc 33.

Further, the image scanner 20 is provided with a control unit 40 for treating the image data signals outputted from the image sensor 25 and the encoder pulses generated by the sub-scanning encoder 30. The control unit 41 has a timing pulse generator 40 for generating timing clock pulses necessary for synchronous processing of the image data signals, a dither setting circuit for processing a half-tone image, a magnification adjusting circuit, a shading-correction circuit, a tone or contrast regulating circuit and so on, similarly to an ordinary image scanner. These circuits are not specifically related to this invention, and therefore, should not be understood as limitative.

The image scanner 20 is provided with a switch 42 for manually switching on the scanner and a dial 43 for adjusting the tone or contrast of a read-out image to be reproduced on the image processing device.

As is understood from the above, the image scanner 20 brings forth the image data signals (video signals) Vs from the image sensor 25, the encoder pulse Ep from the sub-scanning encoder 30, and the timing clock pulse Tp and reset pulse St from the control unit 40. The interface circuit (I/F) 10 according to the invention receives these outputs from the image scanner 20 as illustrated schematically in FIG. 3.

The interface circuit 10 comprises a shift register 11 for temporarily storing the video signals Vs fed serially from the image scanner 20, a counter 12 which receives and counts the timing clock pulses Tp outputted from the control unit 40 of the image scanner 20 and outputs a shift signal Sn each time the timing clock pulses are counted by a prescribed transfer unit of bits, a latching circuit 13 for validating the scanning condition and outputting a transfer permission pulse when the scanning condition is judged to be valid, and a switching circuit (SW.) 14 which permits the video signals Vs stored in the shift register 11 to be transferred to the external image processing device H/C when the shift pulse Sn is outputted from the counter 12 at the time of the scanning condition being valid.

To be more specific, the shift register 11 is adapted to temporarily store the video signals Vs from the image scanner 20 by a prescribed unit of n-bits in synchronization with shift clocks which are obtained on the basis of the timing clock pulses Tp from the image scanner 20. The video signals Vs stored in the shift register 11 are transferred by the transfer unit of n-bits to the image processing device H/C when being permitted by the switching circuit 14. The counter 12 has a function of outputting the shift signal Sn each time the timing clock pulses Tp from the image scanner 20 are counted up to n-bits as the transfer unit. The transferring of the video signals Vs to the image processing device H/C is permitted when the switching circuit 14 receives simultaneously the shift pulse Sn from the counter 12 and the transfer permission signal Sa from the latching circuit 13. In a case where the number of n-bits as one transfer unit is determined to eight (n=8), the shift pulse Sn issues from the counter 12 every eight timing clock pulses Tp (Tp/n), and then, the video signals Vs stored in the shift register 11 are repeatedly outputted by eight bits until all the picture elements on the objective image in one sub-scanning line are completely scanned. Therefore, in the case of n=8, the shift registor 11 may have a storage capacity of only 8 bits. In a case where the number of n-bits as the one transfer unit is determined to 16 (n=16) in order to further increase gradation of gray scale, the storage capacity of the shift register becomes 16 bits.

When all the picture elements (e.g. 1024 pixels) arrayed in a line in the main-scanning direction for one sub-scanning line are completely scanned, and consequently, the transferring of the video signals for one scanning line to the image processing device comes to the end, the sub-scanning line is updated. The updating of the sub-scanning line is attained when the latching circuit 13 and the counter 12 receive the rest pulse St issuing from the image scanner 20. The latching circuit 13 serves to validate the scanning condition while receiving the encoder pulse Ep issuing from the sub-scanning encoder 30. When the scanning condition is judged to be valid, the latching circuit 13 sends a transfer permission signal Sa to the switching circuit 14. That is to say, in a case where the scanning speed is slow to excess, succeeding scanning is judged to be invalid, thereby to prevent the video signals Vs stored in the shift register 11 from being transferred to the image processing device H/C. Even when a plurality of encoder pulses Ep are generated in one sub scanning period by quickly moving the image scanner, the succeeding sub scanning is judged to be valid.

Figure 5:
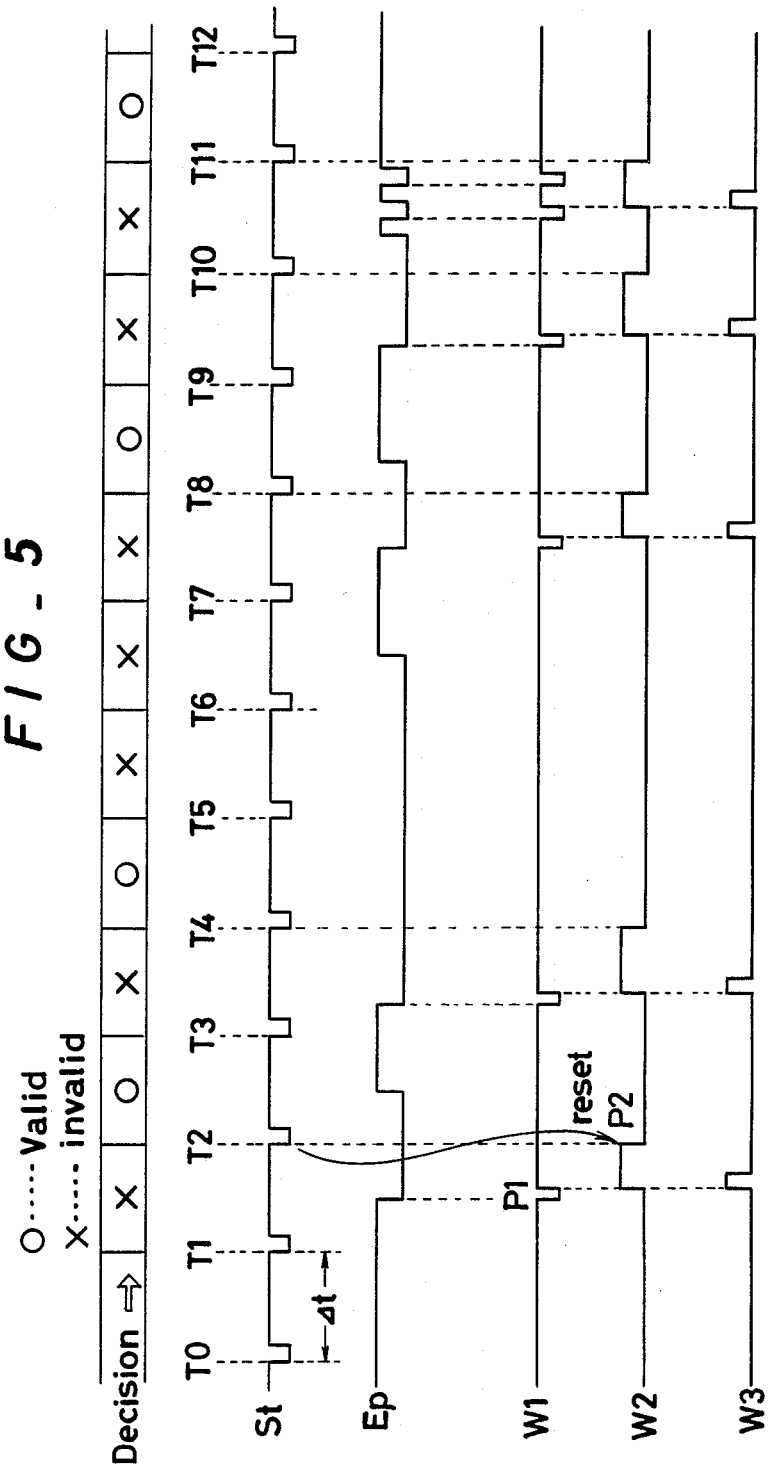
FIG. 5 is an explanatory time chart concerning the operation of a latching circuit in the interface circuit of this invention.

Now, the validation effected by the latching circuit 13 will be explained in detail with reference to FIG. 5. The image scanner 20 outputs the reset signal St each time all the picture elements to be read in one scanning line are completely scanned. That is to say, the pulse interval Δt of the reset pulses St (period T0-T1, T1-T2, ...) corresponds to one cycle of the main-scanning in one scanning line. Generally, the sub-scanning operation is effected by moving continuously the image scanner 20 in the sub-scanning direction. Each time the image scanner 20 moves by one scanning line notionally defined on the objective image plane, the encoder pulse Ep is outputted from the sub-scanning encoder 30. Though the main-scanning cycle time (interval Δt) is constant, the interval at which the encoder pulses Ep are generated by the encoder 30 is irregular and varies with the speed of sub-scanning. The latching circuit 13 effects to validate the scanning condition in accordance with the encoder pulse Ep from the encoder 30. That is to say, when the sub-scanning encoder 30 outputs the encoder pulse Ep at the moment the sub-scanning line is updated by moving the image scanner 20, the fall edge (or rise edge) of the encoder pulse Ep is detected to generate a pulse P1 in a waveform W1, consequently to bring the latching circuit 13 into its latch state as represented by a waveform W2. When the latching circuit 13 assumes the latch state, a signal (waveform W3) for deciding the succeeding sub-scanning to be valid invalid pulse (waveform W3) appears to turn off the transfer permission signal Sa to be sent to the switching is updated to circuit 14. Thus, the video signals are transferred in the succeeding sub-scanning period (T2-T3) next to the period in which the signal W3 is outputted. When the sub-scanning line is updated to output the next reset pulse at T2, the latching circuit 13 in the latch state is reset to assume the transfer valid state in preparation for the succeeding sub-scanning. Then, if the sub-scanning line is not updated in the succeeding sub-scanning, that is, no fall edge of the encoder pulse Ep appears in the period T2-T3, the scanning in the period T3-T4 is judged to be invalid. The scanning in the period T4-T5 is judged to be valid because the signal W3 is outputted in the period T3-T4.

When the image scanner 20 moves slowly or stops, the encoder pulse Ep does not vary as in the period T4-T7, so that no fall edge of the encoder pulse appears. In this state the scanning in T5-T8 is regarded to be invalid, and as a result, the video signals for the same scanning line is in no way transferred to the image processing device H/C. Since the fall edge of the encoder pulse Ep appears in the period T7-T8 and no fall edge appears in T8-T9, the scanning condition in the period T8-T9 is judged to be valid. Similarly, the scanning in T9-T10 becomes invalid and that in T10-T11 becomes valid.

When the image scanner 20 moves fast to generate a plurality of encoder pulses as in the period T10-T11, the latching circuit 13 is brought into its latch state upon reception of the first encoder pulse, with the result that the scanning condition is judged to be valid to transfer the video signals Vs stored in the shift register 5 to the external image processing device H/C. That is, if the encoder pulses Ep appear several times in one sub-scanning period, the video signals for one sub-scanning line are transferred to the image processing device. Unless the encoder pulse Ep falls in the next period T11-T12, the video scanning is regarded to be invalid and therefor signals Vs stored in the shift register is not transferred to the image processing device.

As noted above, according to this invention, the transferring of the video signals Vs to the external image processing device H/C can be reliably effected without need for synchronization with and instructions from the image processing device, because the latching circuit 13 itself can validate the scanning condition. Accordingly, the interface circuit becomes simple in structure and enjoys high-speed processing so that the image scanning can be reliably carried out without developing a scanning error if the sub-scanning speed is rather increased. Thus, the interface circuit according to the invention can be applied to irregular changes of the scanning speed of the image scanner which is manually handled.

Figure 6:
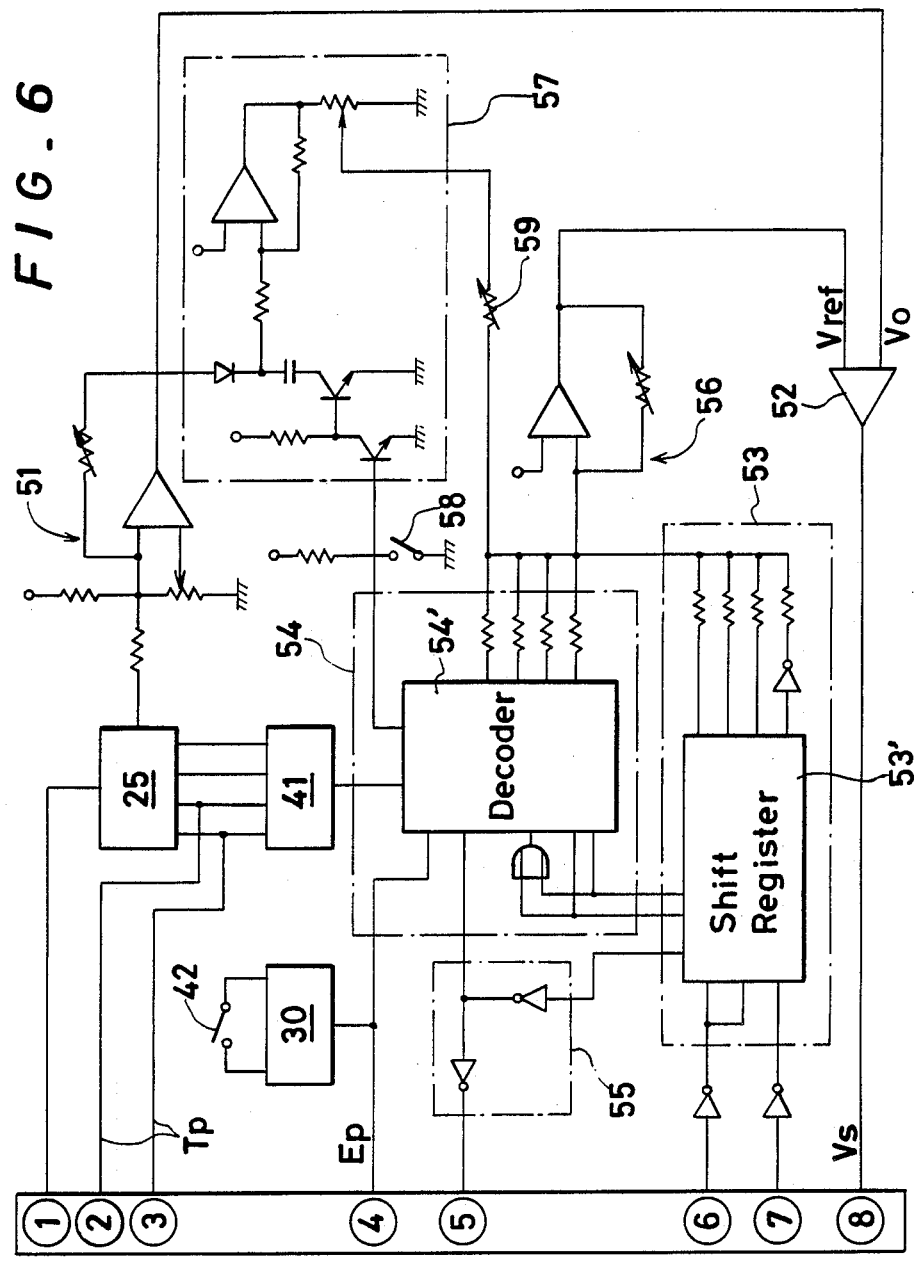
FIG. 6 is a schematic circuit diagram of the image scanner used in this invention.
Figure 7:
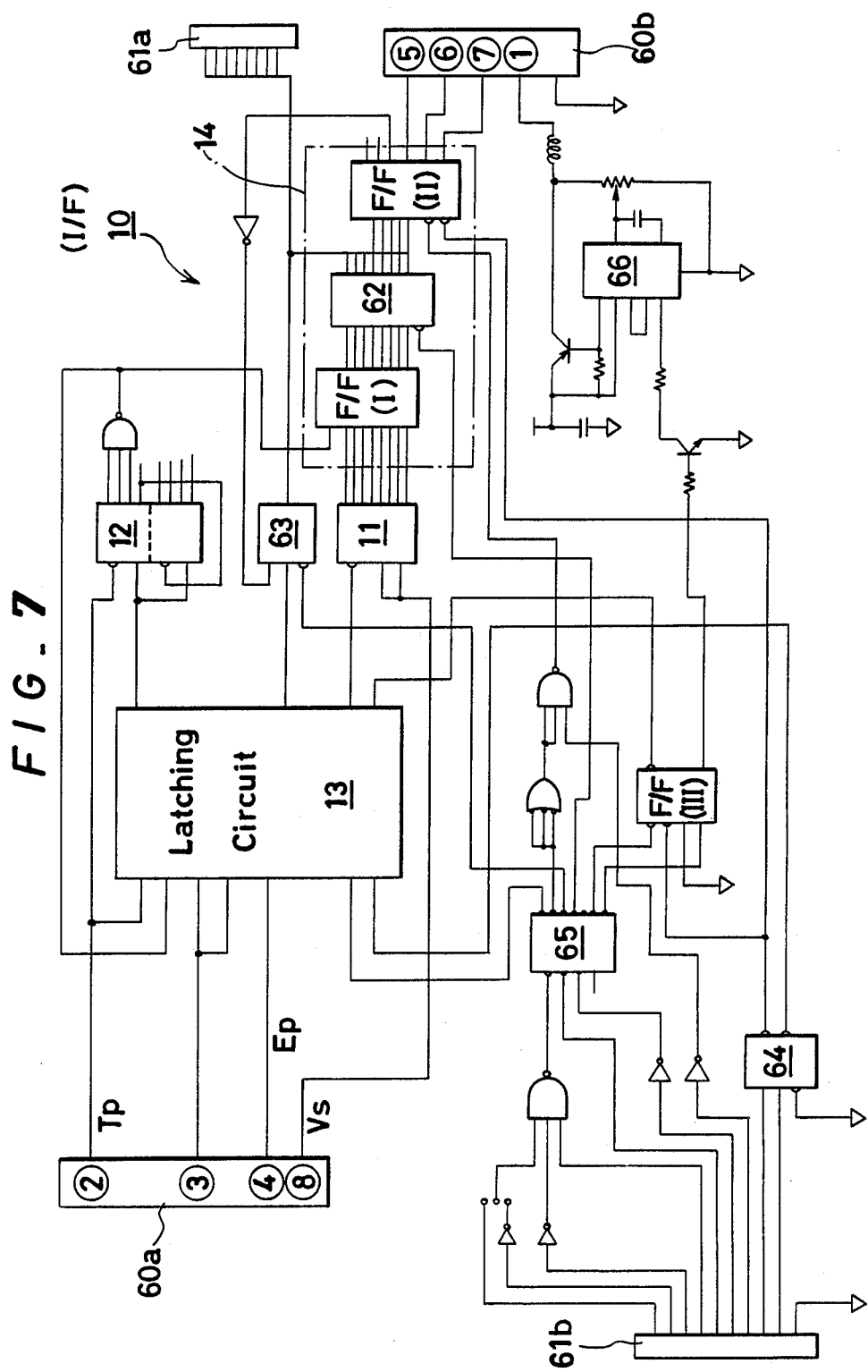
FIG. 7 is a schematic circuit diagram of one embodiment of the interface circuit according to this invention.

FIGS. 6 and 7 schematically illustrate a typical configuration of circuits of the image processing system to which the interface circuit of the invention is applied, wherein FIG. 6 shows the control unit 40 in the image scanner 20, and FIG. 7 shows the interface circuit (I/F) 10 of the invention. The illustrated circuits are composed of integrated circuits.

The control unit of the image scanner 20 has an amplifier circuit 51 for subjecting the image data signals outputted from the image sensor 25 to negative feedback or inverting amplification, a comparator 52 adapted to compare the image data signals Vo outputted from the amplifier circuit 51 with a reference voltage Vref so as to produce binary-coded video signals Vs, as illustrated in FIG. 6. By controlling the reference voltage Vref, various functions can be obtained. That is, the reference voltage Vref is controlled by such functional circuits as a tone regulating circuit 53 for freely determining the tone of the image to be reproduced on the image processing device, a dither setting circuit 54 having a function of processing a half-tone image, a magnification selecting circuit 55 capable of selecting magnification ratio of the image to be reproduced on the image processing device, and other image processing circuits. The output signals from the above functional circuits are given to a reference voltage generator 56 by which the reference voltage Vref is varied with the outputs from the functional circuits and outputted to the comparator 52. By turning on a switch 58 to operate an envelope regulation circuit 57 so as to detect an envelope of the image data outputted from the image sensor 25, the half-tone image such as a photograph is processed by subjecting the image data represented in the envelope form to pseudo-digitization on the basis of dither data programmed in a decoder 54' of the dither setting circuit 54. In the off-state of the switch 58, simple-digitization is effected for processing a high-contrast image such as a character. The tone regulation is effected in accordance with instructions from the external image processing device H/C, which are given to a shift register 53' in the tone regulating circuit 53. Shading strains, which are inevitably brought about due to unevenness in illumination or image ground, can be eliminated by a shading-correction circuit 59.

To the interface circuit (I/F) 10 through an I/0 connector 60, there are outputted the timing pulses Tp from a timing pulse generator 41, the encoder pulses Ep from the sub-scanning encoder 30, and the video signals Vs. Also, the image scanner 20 receives a control signal and so on from the interface circuit 10 through the I/0 connector 60.

The counterpart I/0 connector as indicated by reference numeral 60a, 60b in FIG. 7 is disposed on the interface circuit (I/F) 10, through which various data signals as noted above and control signals are interchanged relative to the image scanner 20. Through the I/0 connectors 60a, 60b connected to the image scanner 20 and those 61a, 61b connected to the host computer H/C are illustratively divided each into two in FIG. 7, the respective connectors are formed in one in general. Every terminal indicated by terminal number of the interface circuit shown in FIG. 7 is connected to the corresponding terminal indicated by the same number of the image scanner illustrated in FIG. 6. As was described earlier with reference to FIG. 2, the video signals Vs outputted from the image scanner 20 as a result of scanning the objective image are fed to and temporarily stored in the shift register 11, while the timing pulses Tp from the image scanner 20 are given to the counter 12. The encoder pulse Ep from the sub-scanning encoder 30 is given to the latching circuit 13 constituted by a plurality of latching elements, thereby to reset the latching circuit 13. As far as the latching circuit 13 decides the scanning condition to be invalid, the switching circuit 14 composed of flip-flops F/F(I) and F/F(II) is kept in the transfer permission state. In this state of the switching circuit 14, an output port 62 in the switching circuit 14 is operated, upon reception of the shift pulse Sn from the counter 12, to permit the video signals Vs stored in the shift register 11 to be transferred to the external image processing device H/C through the I/0 connector 61a. The interface circuit 10 is further provided with bus driver 63, 64, a line decoder 65, and a voltage regulator 66 for controlling the operation.

As is clear from the disclosure thus far made, according to the present invention, since video signals which are outputted from an image scanner and stored temporarily in a shift register are transferred to an external image processing device such as a word processor without need to receive instructions from the image processing device, image scanning and data transferring can be reliably effected at high speed so that an image reading operation can be continuously performed without causing a scanning error even if the image scanner is moved fast or slowly to excess. Besides, since an image processing system using the interface circuit according to this invention has no need for a feed-back system through which the interface circuit is controlled by the external image processing device upon evaluating the results of scanning, the system according to the invention excels in efficiency and reliability and enjoys simplicity structure and can be manufactured inexpensively. Thus, this invention proves highly practicable.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. A method for interfacing an image scanner for scanning a given objective image to obtain video data signals and outputting video data signals with an image processing device, comprising the steps of:
   generating encoder pulses from a sub-scanning encoder contained in said image scanner each time a sub-scanning operation is updated by moving said image scanner relative to the given objective image;
   temporarily storing the video data signals outputted from said image scanner, and represented by a transfer unit of n-bits, in a shift register;
   making a judgment of a scanning condition so that the scanning condition in a succeeding sub-scanning line is considered to be valid when the encoder pulse is generated; and
   permitting said video data signals represented by said transfer unit of n-bits stored in the shift register to be transferred to the image processing device while main scanning in the sub-scanning line which is judged to be valid is carried out.

2. An interface circuit connected electrically to an image scanner for outputting video data signals obtained by scanning a given objective image and sub-scanning encoder pulses generated each a time a sub-scanning is updated, and connected electrically to an image processing device so as to transfer thereto the video data signals fed from said image scanner, which comprises:
   decision means for making a judgment of a scanning condition so that the scanning condition in a succeeding sub-scanning line is considered to be valid when the encoder pulse is outputted from said image scanner;
   shift register means for temporarily storing the video data signals outputted from said image scanner, said video data represented by a transfer unit of n-bits; and
   data transferring means for permitting said video data signals stored in the shift register means to be transferred to the image processing device as said transfer unit of n-bits while main scanning of the sub-scanning line which is judged to be valid is carried out.

3. An interface circuit according to claim 2, wherein:
   said data transferring means further comprises a latching circuit for outputting a transfer permission signal when the scanning condition is judged to be valid, said latching circuit assumes its reset state upon reception of a reset pulse generated from said image scanner, and a switching circuit for permitting the video data signals stored in said shaft register means to be transferred to said image processing device upon reception of the transfer permission signal outputted from said latching circuit.

* * * * *

UNITED STATES PATENT AND TRADEMARK OFFICE
CERTIFICATE OF CORRECTION

PATENT NO. : 4,866,535

DATED : Sep. 12, 1989

INVENTOR(S) : Mineo Kubota, et al

It is certified that error appears in the above-identified patent and that said Letters Patent is hereby corrected as shown below:

On the title page

The second inventor's first name is incorrectly recorded "Tuyos Isomura" should be:

--Tuyosi Isomura--

Signed and Sealed this

Ninth Day of October, 1990

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,866,535
DATED : Sep. 12, 1989
INVENTOR(S) : Mineo Kubota, et al

It is certified that error appears in the above-identified patent and that said Letters Patent is hereby corrected as shown below:

Title page:

The Assignee is incorrect, "Kabushiki Kaisha", should be:

--NIPPON SEIMITSU KOGYO KABUSHIKI KAISHA--

Signed and Sealed this

Twenty-seventh Day of November, 1990

*Attest:*

HARRY F. MANBECK, JR.

*Attesting Officer*          *Commissioner of Patents and Trademarks*